US010003631B1

(12) United States Patent
Level et al.

(10) Patent No.: US 10,003,631 B1
(45) Date of Patent: Jun. 19, 2018

(54) MODIFYING USER EXPERIENCES

(71) Applicant: Amazon Technologies, Inc., Seattle, WA (US)

(72) Inventors: Haroldo Jose Level, Seattle, WA (US); Yonnas Getahun Beyene, Lynnwood, WA (US); Jonathan Michael Cohen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 143 days.

(21) Appl. No.: 14/739,331

(22) Filed: Jun. 15, 2015

(51) Int. Cl.
   G06F 15/16 (2006.01)
   H04L 29/08 (2006.01)
   H04L 29/06 (2006.01)

(52) U.S. Cl.
   CPC ........... H04L 67/02 (2013.01); H04L 67/10 (2013.01); H04L 67/306 (2013.01); H04L 67/42 (2013.01)

(58) Field of Classification Search
   CPC .. G06F 8/443; G06F 17/30905; G06F 17/211; G06F 17/3089; H04L 41/0253
   See application file for complete search history.

(56) References Cited

U.S. PATENT DOCUMENTS

| 2010/0305940 | A1* | 12/2010 | Dendi | G06F 17/289 704/3 |
| 2013/0246906 | A1* | 9/2013 | Hamon | G06F 17/2252 715/234 |
| 2014/0229533 | A1* | 8/2014 | Whitcomb | G06F 17/30902 709/203 |
| 2015/0046789 | A1* | 2/2015 | Wei | G06F 9/4445 715/234 |

* cited by examiner

Primary Examiner — Brian J Gillis
Assistant Examiner — Kamran Mohammadi
(74) Attorney, Agent, or Firm — Thomas | Horstemeyer, LLP

(57) ABSTRACT

Disclosed are various embodiments for an experience service. An experience service determines if a client device requesting a network page is to receive a modified user experience. Transformation code corresponding to the user experience is communicated to the client device. The client device executes the transformation code to modify a rendering of the requested network page.

18 Claims, 5 Drawing Sheets

MODIFYING USER EXPERIENCES

BACKGROUND

User interfaces may be modified or iterated on to improve a user experience. Changes to a user interface may be tested before deployment.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The user experience created by user interfaces presented to a user may affect how the user interacts with a system. The user experience may include fonts, images, content, layouts, placement of elements, and other components of a user interface. In the example of an electronic commerce system, the user experience may affect how a user browses items, selects items for sale, and otherwise interacts with the electronic commerce system. To this end, the user interface may be modified to induce user behavior, such as increase purchases of items. In some examples, a new user experience may be tested on a portion of users to determine whether to deploy the new user experience to the system. This may include performing NB testing, or other tests. However, some systems require more complex deployment operations and code pushes to a code repository in order to make the new user experience available to users included in the test.

A code generation service can parse a network page for a new user experience to generate transformation code. The transformation code, when executed by a client, converts a network page encoded for one user experience to another. The transformation code may include, for example, a script executed by a browser application rendering the network page, such as JavaScript® or another script. The transformation code may also include input to a browser plugin implemented in the client device. When a client device requests the network page, an experience service determines if the client device corresponds to a user to receive a modified user experience. If so, the experience service loads the corresponding transformation code from a data store and communicates the transformation code and the network page to the client device. On rendering the network page, the client device also executes the transformation code to modify the rendering of the network page, such that the rendered network page conforms to the modified user experience.

By abstracting the modified user experience into transformation code separate from the network page, a client can receive the modified user experience with no modification to the base code of the network page. Thus, new network pages do not have to be deployed to a network page server to perform user experience experiments. Furthermore, by separately maintaining the transformation code, a modified user experience can be updated by altering the transformation code, further preventing the need to deploy new network page code. This allows for faster updating of modified user experiences, as new network page code does not need to be deployed and propagated. Additionally, by abstracting out the communication of transformation code, third party network page servers may access the experience service to participate in user experience experiments.

In the following discussion, a general description of the system and its components is provided, followed by a discussion of the operation of the same.

Figure 1:
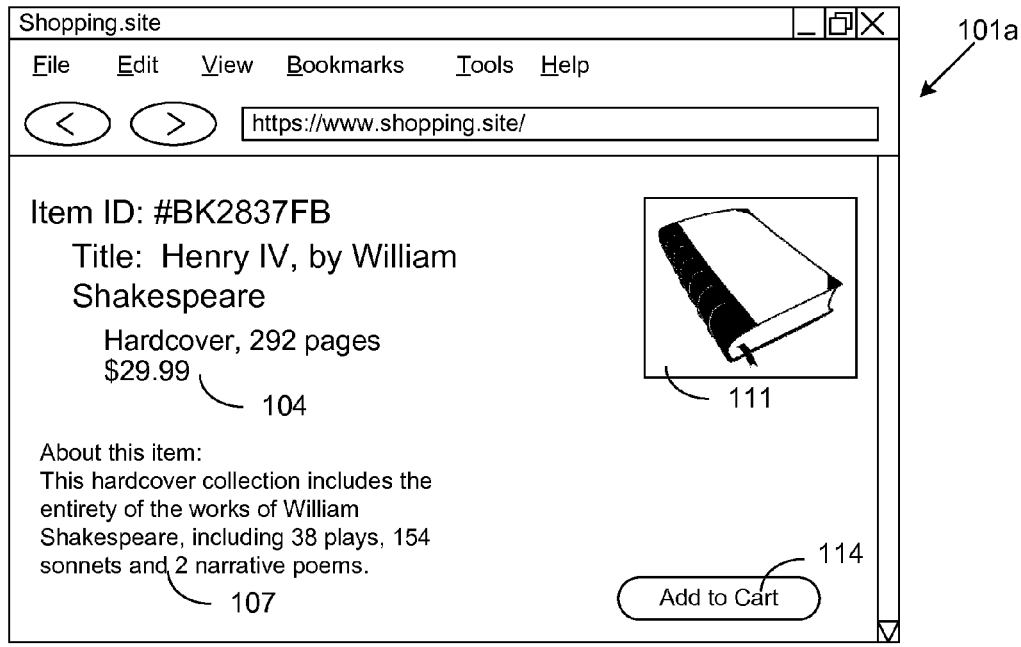
FIG. 1 is a pictorial representation of example scenario according to various embodiments of the present disclosure.
Figure 1:
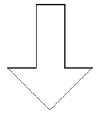
Figure 1:
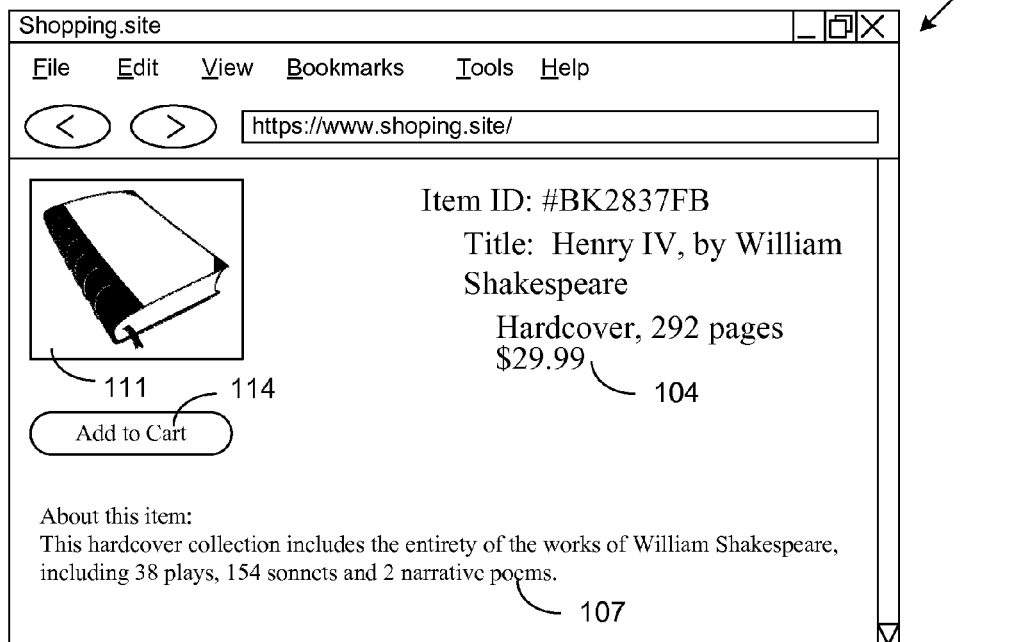

With reference to FIG. 1, shown is an example scenario depicting a modification of a user experience according to various embodiments of the present disclosure. Included in FIG. 1 are user interfaces 101a and 101b. User interface 101a corresponds to an unmodified user experience. In other words, user interface 101a corresponds to a rendering of a network page without additional transformation code executed by a client device. User interface 101b corresponds to a modified user experience, where a client device executes transformation code to modify the user interface 101a to instead be rendered as the user interface 101b. Included in the user interfaces 101a/b are item attributes 104, an item description 107, an item image 111, and a button 114. In executing the translation code, the placement of the item attributes 104, item description 107, item image 111 and button 114 are repositioned in the user interface 101b. Additionally, the font of text included in the user interface 101b has changed.

Figure 2:
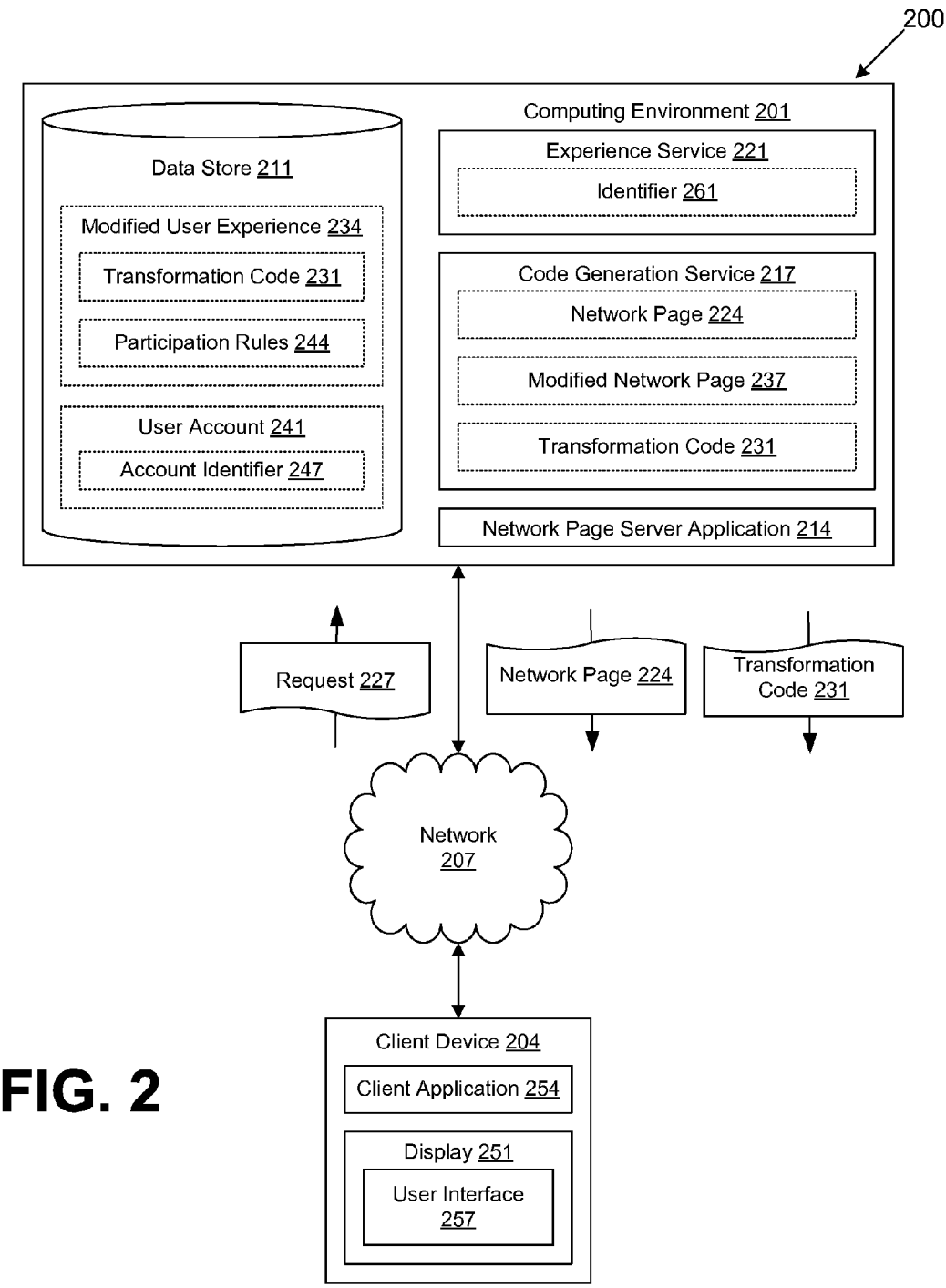
FIG. 2 is a drawing of a networked environment according to various embodiments of the present disclosure.

Moving on to FIG. 2, shown is a networked environment 200 according to various embodiments. The networked environment 200 includes a computing environment 201, and a client device 204, which are in data communication with each other via a network 207. The network 207 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 201 may comprise, for example, a server computer or any other system providing computing capability. Alternatively, the computing environment 201 may employ a plurality of computing devices that may be arranged, for example, in one or more server banks or computer banks or other arrangements. Such computing devices may be located in a single installation or may be distributed among many different geographical locations. For example, the computing environment 201 may include a plurality of computing devices that together may comprise a hosted computing resource, a grid computing resource and/or any other distributed computing arrangement. In some cases, the computing environment 201 may correspond to an elastic computing resource where the allotted capacity of processing, network, storage, or other computing-related resources may vary over time.

Various applications and/or other functionality may be executed in the computing environment 201 according to various embodiments. Also, various data is stored in a data store 211 that is accessible to the computing environment 201. The data store 211 may be representative of a plurality of data stores 211 as can be appreciated. The data stored in the data store 211, for example, is associated with the operation of the various applications and/or functional entities described below.

The components executed on the computing environment 201, for example, include a network page server application 214, a code generation service 217, an experience service 221, and other applications, services, processes, systems, engines, or functionality not discussed in detail herein. The network page server application 214 is executed to communicate network pages 224 to client devices 204 via the network 207. This may be performed, for example, in response to a request 227 for a network page 224 from the client device 204. The network page server application 214 may also communicate transformation code 231 to client devices 204 via the network 207 as will be discussed in further detail below. Although the network page server application 214 is shown as being executed in the same computing environment 201 as the code generation service 217 and experience service 221, it is understood that the network page server application 214 may be executed in a distinct computing environment 201 in some embodiments. For example, the network page server application 214 may correspond to a third-party web site or other service distinct from a service provider implementing the code generation service 217 or experience service 221.

The code generation service 217 is executed to generate transformation code 231 for a modified user experience 234. To this end, the code generation service 217 parses a network page 224 that is a modified version of another network page 224. Such a modified version is hereinafter known as a modified network page 237. The code generation service 217 parses the modified network page 237 to determine the differences between a network page 224 and the modified network page 237 and generates transformation code 231 that, when executed by a client device 204, renders the network page 224 as the modified network page 237.

The experience service 221 determines if a user corresponding to a client device 204 requesting a network page 224 is included in a selection of users designated to receive a modified user experience 234. If so, the experience service 221 loads transformation code 231 corresponding to the modified user experience 234. The client device 204 then receives the requested network page 224 and the transformation code 231 as facilitated by the network page server application 214.

The data stored in the data store 211 includes, for example, user experiences 234, user accounts 241 and potentially other data. User experiences 234 encapsulate modifications to network pages 224 requested by client devices 204. Such modifications may include, for example, modifications to a font, title, content, placement of elements, or other aspect of a network page 224. These modifications may correspond to a change in a Document Object Model (DOM), a template, style sheet, layout, or other component of a network page 224. User experiences 234 are associated with transformation code 231 that apply the modifications to a rendering of a network page 224 when executed by a client device 204. To this end, the transformation code 231 may correspond to a script such as JavaScript®, or another script as can be appreciated. The transformation code 231 may also include code, logic, scripts, parameters, or other values accessed by a browser plugin or other functionality executed on the client device 204.

User experiences 234 may also include participation rules 244 that define one or more conditions that, when satisfied, determine that a client device 204 should receive a corresponding modified user experience 234. For example, participation rules 244 may define a percentage or distribution of users or client devices 204 to receive the modified user experience 234. Participation rules 244 may also indicate one or more attributes of a user account 241 that will receive the modified user experience 234. Participation rules 244 may also define other criteria for participants of a modified user experience 234.

A user account 241 comprises data associated with one or more users accessing the computing environment 201. User accounts 241 may comprise, for example, login information such as usernames or passwords to authenticate a user accessing content served by the computing environment 201. The user accounts 241 may also comprise contact information such as a mailing address, email address, phone number or other contact information. Additionally, the user accounts 241 may comprise data representing payment instruments used to consummate an order with the electronic commerce system, including credit cards, debit cards, banking accounts, prepaid accounts, or other payment instruments. User accounts 241 may also comprise user preferences embodying settings, configurations, or other preferences. User accounts 241 may also include an account identifier 247 uniquely identifying the corresponding user account 241. The account identifier 247 may correspond to a user name or other authentication credential of the user account. The account identifier 247 may also correspond to an email address or other contact information of the user account 241. The account identifier 247 may also include a numeric or alphanumeric string uniquely identifying the user account 241 independent of other attributes of the user account 241. The user account may also include other data.

The client device 204 is representative of a plurality of client devices that may be coupled to the network 207. The client device 204 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 204 may include a display 251. The display 251 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 204 may be configured to execute various applications such as a client application 254 and/or other applications. The client application 254 may be executed in a client device 204, for example, to access network content served up by the computing environment 201 and/or other servers, thereby rendering a user interface 257 on the display 251. To this end, the client application 254 may comprise, for example, a browser, a dedicated application, etc., and the user interface 257 may comprise a network page 224, an application screen, etc. The client device 204 may be configured to execute applications beyond the client application 254 such as, for example, email applications, social networking applications, word processors, spreadsheets, and/or other applications.

Next, a general description of the operation of the various components of the networked environment 200 is provided. To begin, the experience service 221 defines a modified user experience 234. This may include defining transformation code 231 corresponding to the modified user experience 234. The transformation code 231, when executed by a client device 204, transforms a rendering of a network page 224 to reflect one or more user interface 257 changes for the modified user experience 234. In some embodiments, the transformation code 231 may be created through a code editing platform, Software Development Kit (SKD), or Integrated Development Environment (IDE) and stored in association with a designated modified user experience 234.

In other embodiments, creating the transformation code 231 may be facilitated by a code generation service 217. The code generation service 217 may compare a network page 224 to a modified network page 237 reflecting the user interface 257 changes of the modified user experience 234. The code generation service 217 may parse one or more components of the network page 224 and the modified network page 237 to determine the differences between the network page and modified network page 237. This may include comparing Document Object Models (DOMs), style sheets, layouts, templates, HyperText Markup Language (HTML) tags or elements, or other components. The code generation service 217 then selects one or more functions or operations for inclusion in the transformation code 231. The functions or operations are selected such that, when executed by a client application 254 rendering the network page 224, causes the network page 224 to be rendered as the modified network page 237. The transformation code 231 may generated as JavaScript® or another script executed by a browser client application 254.

In some embodiments, the code generation service 217 may implement one or more services or expose an Application Program Interface (API) to facilitate the upload or selection of the network page 224 or the modified network page 237 for parsing. In other embodiments, the code generation service 217 may encode for rendering a user interface 257 to facilitate the modification of the network page 224. The modifications input to the user interface 257 would then be reflected in the modified network page 237. In some embodiments, the code generation service 217 may convert the modifications to the network page 224 into transformation code 231 functions as they are input, instead of parsing a modified network page 237. The transformation code 231 may also be generated by another approach. After the transformation code 231 is generated, the experience service 221 stores the transformation code 231 in association with a modified user experience 234 in the data store 211.

The experience service 221 may also re-associate the modified user experience 234 with modified or new transformation code 231. Participants in the modified user experience 234 would then receive the modified or new transformation code 231 instead of the previously associated transformation code 231. Communication and receipt of transformation code 231 by participants in the modified user experience 234 will be discussed in further detail below.

The experience service 221 may also associate one or more participation rules 244 with a modified user experience 234 to designate users to receive the corresponding modified user experience 234. The participation rules 244 may include one or more rules that, when applied to attributes of the user account 241, determine whether client devices 204 accessing the computing environment 201 will receive the corresponding modified user experience 234. This may include rules applied to geographic data, location data, demographic data, subscription tiers, preferences, or other attributes. The participation rules 244 may also define a maximum or minimum number of client devices 204, user accounts 241, or other entity to receive the modified user experience 234. Participation rules 244 may also define a percentage or distribution of entities to receive the modified user experience 234. Participation rules 244 may also define other criteria or rules for designating participants in a corresponding modified user experience 234.

After defining a modified user experience 234, the network page server application 214 receives a request 227 for a network page 224 from a client device 204. In some embodiments, the network page server application 214 then queries the experience service 221 to determine if the client device 204 or a user of the client device 204 is participating in a modified user experience 234. This may include determining if the client device 204 or user of the client device 204 is associated with a previous participation in the modified user experience 234. In other words, this may include determining if the client device 204 or user of the client device 204 previously received transformation code 231 associated with the modified user experience 234. In some embodiments, this may include determining if an identifier 261 associated with the client device 204 corresponds to a modified user experience 234. The identifier 261 may include an account identifier 247. For example, if the client device 204 is authenticated with a user account 241 accessing the computing environment 201, the experience service 221 may determine if transformation code 231 was previously communicated to a client device 204 corresponding to the account identifier 247. The identifier 261 may also include a session identifier or another identifier 261.

Determining if the client device 204 is participating in the modified user experience 234 may also include applying one or more participation rules 244 to attributes of the client device 204 or a user account 241 corresponding to the client device 204. This may also include determining if the client device 204 or a user account 241 corresponding to the client device 204 is included in a distribution selected to participate in the modified user experience 234. This may further include determining if an end time, maximum number of participants, or other termination criteria associated with a modified user experience 234 has been satisfied. This may also include determining participation in the modified user experience 234 by another approach.

If the client device 204 is determined to receive the modified user experience 234, the experience service 221 selects transformation code 231 from the data store 211 corresponding to the modified user experience 234. The network page server application 214 then communicates the requested network page 224 and transformation code 231 to the client device 204. In some embodiments, this includes inserting the transformation code 231 into the network page 224. In other embodiments, this includes inserting a tag or reference to the transformation code 231 into the network page 224. In this embodiment, when the network page 224 is rendered by the client application 254, the client application 254 generates a subsequent request 227 for the transformation code 231 according to the tag or reference. The client application 254 then executes the transformation code 231 to modify a user interface 257 rendering of the network page 224.

In another embodiment, in response to the request 227 for the network page 224, the network page server application 214 may communicate the network page 224 to the client device 204 with a tag or reference to transformation code 231. On rendering of the network page 224 by the client application 254, the client device 204 communicates another request 227 for the referenced transformation code 231. In this embodiment, the experience service 221 then determines whether the client device 204 is to receive a modified user experience 234 as described above. If the client device 204 is not a participant in a modified user experience 234, the network page server application 214 may reply to the request for transformation code 231 with no transformation code 231, or transformation code 231 that does not modify a rendering of the requested network page 224. Otherwise, the experience service 221 selects transformation code 231 as was described above. The network page server application 214 then communicates the transformation code 231 to the participating client device 204 via the network 207.

Figure 3:
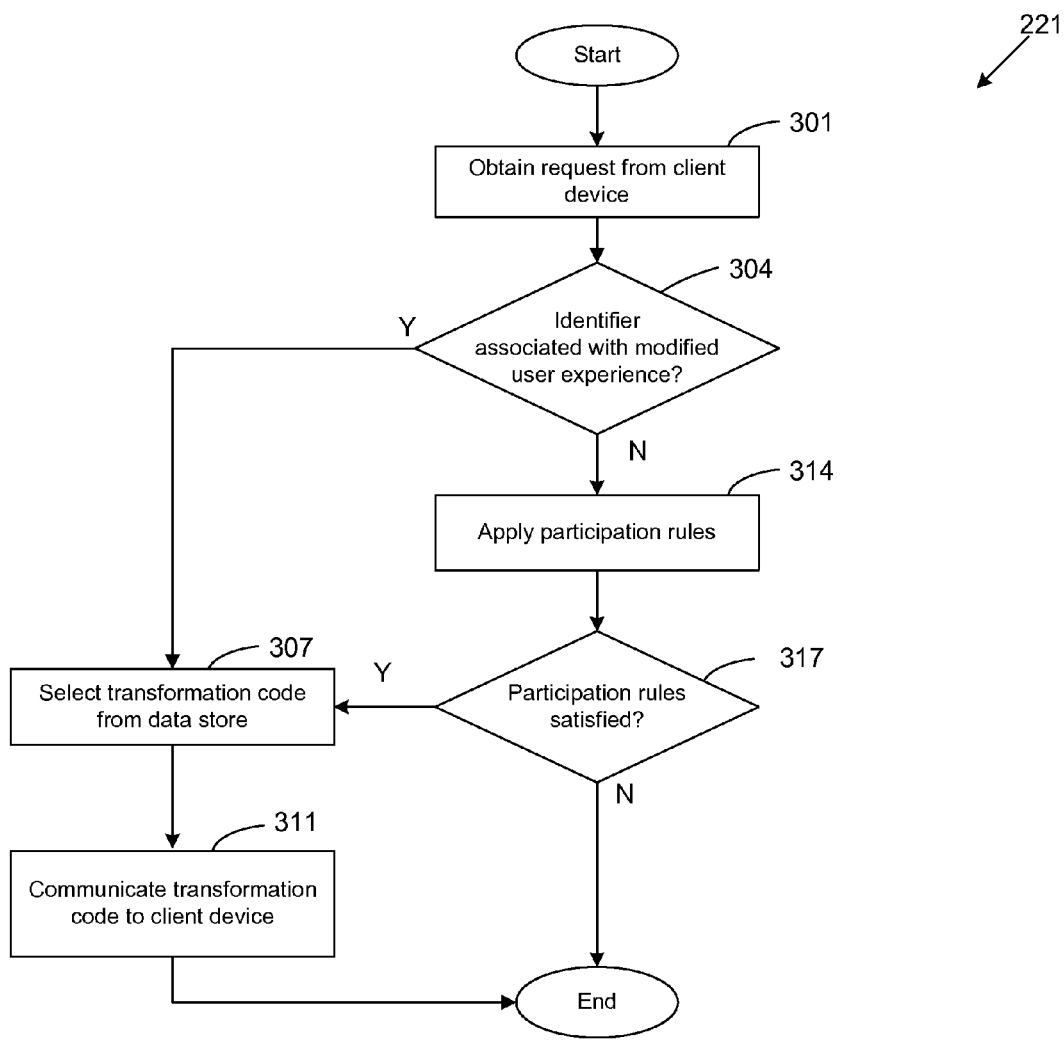
FIGS. 3 and 4 are flowcharts illustrating examples of functionality implemented in a computing environment in the networked environment of FIG. 2 according to various embodiments of the present disclosure.

Turning now to FIG. 3, shown is a flowchart that provides one example of the operation of a portion of the experience service 221 according to various embodiments. It is understood that the flowchart of FIG. 3 provides merely an example of the many different types of functional arrangements that may be employed to implement the operation of the portion of the experience service 221 as described herein. As an alternative, the flowchart of FIG. 3 may be viewed as depicting an example of elements of a method implemented in the computing environment 201 (FIG. 2) according to one or more embodiments.

Beginning with box 301, the experience service 221 obtains a request 227 (FIG. 2) from a client device 204 (FIG. 2). In some embodiments, the request 227 may identify a network page 224 (FIG. 2) requested by the client device 204. In other embodiments, the request 227 may include a request for transformation code 231 (FIG. 2) corresponding to a tag or reference in a network page 224 previously communicated to the client device 204.

Next, in box 304, the experience service 221 determines if the client device 204 corresponds with an identifier 261 (FIG. 2) indicating a previous participation in a modified user experience 234. This may include selecting the identifier 261 as a session identifier 261 or account identifier 247 included in the request 227 or otherwise associated with the client device 204. The experience service 221 may then query the data store 211 to determine if a client device 204 had previously been communicated the transformation code 231 (FIG. 2) corresponding to the modified user experience 234 or was otherwise designated for participation in the modified user experience 234. If so, the process advances to box 307, where the experience service 221 selects transformation code 231 corresponding to the modified user experience 234. This may include, for example, loading the transformation code 231 from a data store 211. By maintaining the transformation code 231 in a data store 211 for dynamic loading and communication to client devices 204, the transformation code 231 can be replaced, updated, or otherwise modified without affecting the code of network pages 224 affected by the transformation code 231. Thus, the modified user experience 234 can be altered without requiring additional deployment of network page 224 code.

After selecting the transformation code 231, in box 311, the experience service 221 communicates the transformation code 231 to the client device 204 via the network page server application 214 (FIG. 2). In some embodiments, this includes inserting the transformation code 231 into a network page 224 indicated in the request 227. In other embodiments, this includes inserting a tag or reference to the transformation code 231 into the network page 224. In this embodiment, when the network page 224 is rendered by a client application 254 (FIG. 2), the client application 254 generates a subsequent request 227 for the transformation code 231 according to the tag or reference. After communicating the transformation code 231 to the client device 204, the process ends.

Returning to box 304, if the client device 204 is not associated with an identifier 261 for a modified user experience 234, the process proceeds to box 314 where the experience service 221 applies participation rules 244. The participation rules 244 may be applied to attributes of a user account 241 through which the client device 204 accesses the computing environment 201. This may include applying participation rules 244 to location data, geographical data, demographic data, user preferences, or other attributes. This may also include determining if a maximum threshold of client devices 204 or users participating in a modified user experience 234 is satisfied. This may further include determining whether the client device 204 or a user of the client device 204 is included in a percentage or distribution of participants in the user experience. Participation rules 244 may also be applied by another approach. If, in box 317, the participation rules 244 are satisfied, the process advances to box 307, where the transformation code 231 is selected for communication in box 311. Otherwise, the process ends.

Figure 4:
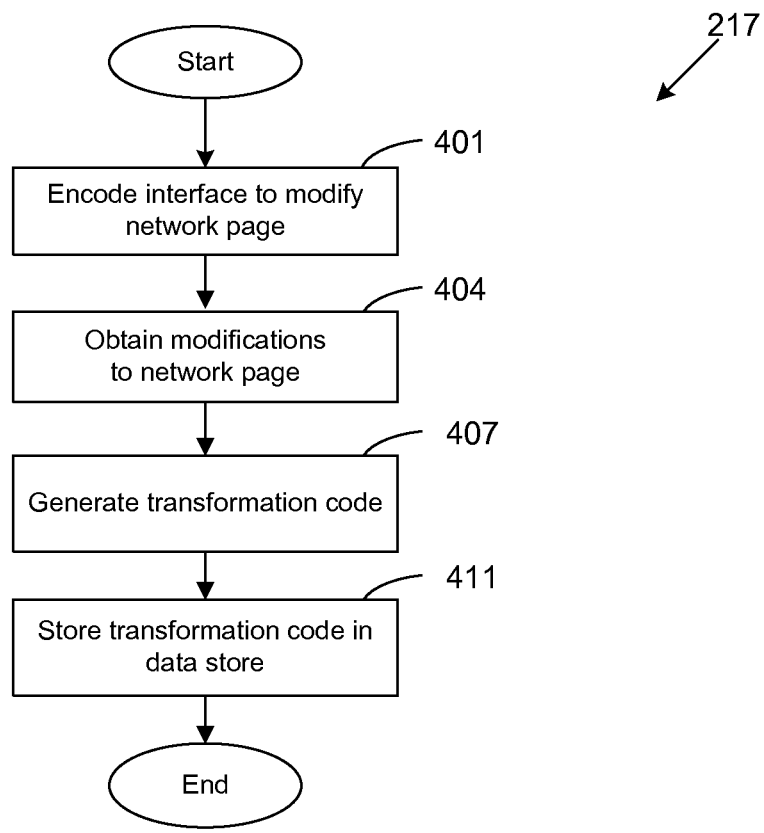

Turning now to FIG. 4, shown is a flowchart that provides one example of the operation of a portion of the code generation service 217 according to various embodiments. It is understood that the flowchart of FIG. 4 provides merely an example of the many different types of functional arrangements that may be employed to implement the operation of the portion of the code generation service 217 as described herein. As an alternative, the flowchart of FIG. 4 may be viewed as depicting an example of elements of a method implemented in the computing environment 201 (FIG. 2) according to one or more embodiments.

Beginning with box 401, the code generation service 217 encodes for rendering a user interface 257 (FIG. 2) to modify a network page 224 (FIG. 2). In some embodiments, the user interface 257 may be encoded for rendering by a dedicated client application 254. In other embodiments, the user interface 257 may be encoded as a network page 224 for rendering by a browser client application 254 (FIG. 2) executed by a client device 204. Next, in box 402, the code generation service 217 obtains modifications to the network page 224 as inputs to the user interface 257. Such modifications may include, for example, modifications to style sheets, templates, table elements, content placement, font, HTML tags or elements, or other modifications.

After obtaining the modifications to the network page 224, in box 407, the code generation service 217 generates transformation code 231 from the modifications. In some embodiments, this includes parsing a modified network page 237 (FIG. 2) to determine differences with respect to the network page 224 modified according to the user interface 257 encoded in box 401. This may also include selecting functions, operations, values, or other components of a scripting language, code, or other data corresponding to the modifications. The transformation code 231 may be generated as a scripting language such as JavaScript® or another scripting language, as input to a browser plugin, or as other data. The code generations service 217 then stores the transformation code 231 in the data store 211 in association with a modified user experience 234 in box 411, after which the process ends.

Figure 5:
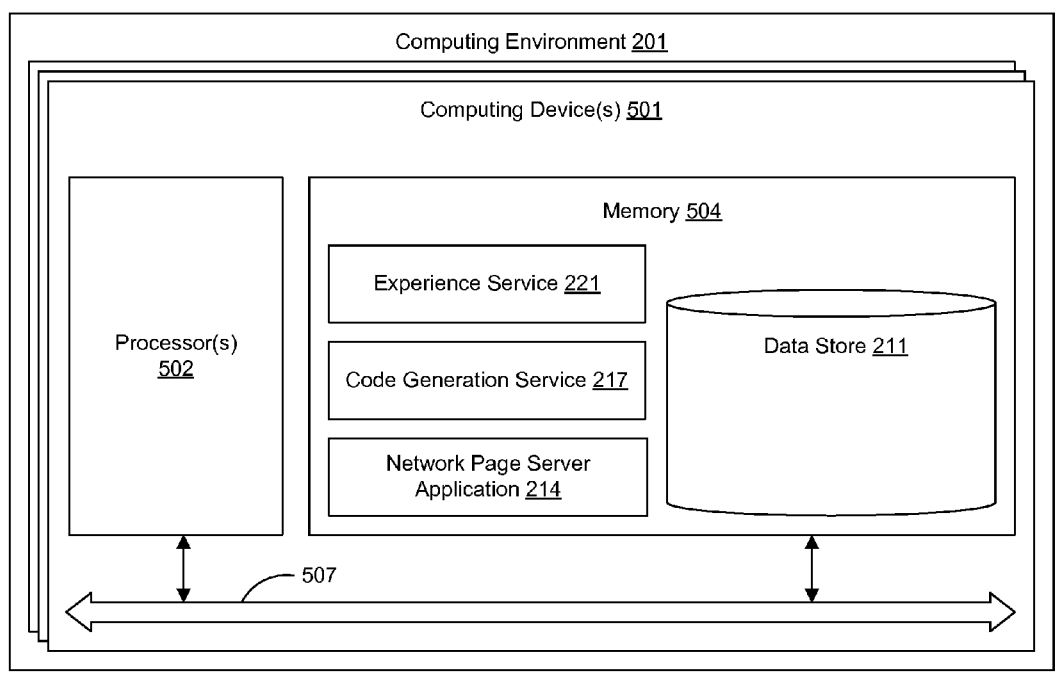
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 201 according to an embodiment of the present disclosure. The computing environment 201 includes one or more computing devices 501. Each computing device 501 includes at least one processor circuit, for example, having a processor 502 and a memory 504, both of which are coupled to a local interface 507. To this end, each computing device 501 may comprise, for example, at least one server computer or like device. The local interface 507 may comprise, for example, a data bus with an accompanying address/control bus or other bus structure as can be appreciated.

Stored in the memory 504 are both data and several components that are executable by the processor 502. In particular, stored in the memory 504 and executable by the processor 502 are a network page server application 214, a code generation service 217 and an experience service 221, and potentially other applications. Also stored in the memory 504 may be a data store 211 and other data. In addition, an operating system may be stored in the memory 504 and executable by the processor 502.

It is understood that there may be other applications that are stored in the memory 504 and are executable by the processor 502 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 504 and are executable by the processor 502. In this respect, the term "executable" means a program file that is in a form that can ultimately be run by the processor 502. Examples of executable programs may be, for example, a compiled program that can be translated into machine code in a format that can be loaded into a random access portion of the memory 504 and run by the processor 502, source code that may be expressed in proper format such as object code that is capable of being loaded into a random access portion of the memory 504 and executed by the processor 502, or source code that may be interpreted by another executable program to generate instructions in a random access portion of the memory 504 to be executed by the processor 502, etc. An executable program may be stored in any portion or component of the memory 504 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 504 is defined herein as including both volatile and nonvolatile memory and data storage components. Volatile components are those that do not retain data values upon loss of power. Nonvolatile components are those that retain data upon a loss of power. Thus, the memory 504 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 502 may represent multiple processors 502 and/or multiple processor cores and the memory 504 may represent multiple memories 504 that operate in parallel processing circuits, respectively. In such a case, the local interface 507 may be an appropriate network that facilitates communication between any two of the multiple processors 502, between any processor 502 and any of the memories 504, or between any two of the memories 504, etc. The local interface 507 may comprise additional systems designed to coordinate this communication, including, for example, performing load balancing. The processor 502 may be of electrical or of some other available construction.

Although the code generation service 217 and experience service 221, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the code generation service 217 or experience service 221. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 502 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the code generation service 217 and experience service 221, that comprises software or code can be embodied in any non-transitory computer-readable medium for use by or in connection with an instruction execution system such as, for example, a processor 502 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the code generation service 217 and experience service 221, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 501, or in multiple computing devices in the same computing environment 201. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method comprising:
in response to a first request for a network page from a first client device, determining, by at least one computing device, that the first client device corresponds to a distribution of users associated with a modified user experience;
selecting, by the at least one computing device, transformation code corresponding to the modified user experience from a data store;
in response to the first client device being included in the distribution, communicating, by the at least one computing device, the transformation code to the first client device;
communicating, by the at least one computing device, the network page to the first client device;
wherein the transformation code is configured to modify, on execution by the first client device, a Document Object Model (DOM) of the network page;
in response to a second request for the network page from a second client device, determining, by the at least one computing device, that the second client device does not correspond to the distribution of users associated with the modified user experience; and
communicating, by the at least one computing device, the network page to the second client device, wherein the transformation code is not communicated to the second client device.

2. The method of claim 1, wherein determining that the first client device corresponds to the distribution of users is based at least in part on an identifier associated with a previous communication of the transformation code.

3. The method of claim 2, wherein the identifier comprises at least one of a session identifier or an account identifier.

4. A system, comprising:
at least one computing device; and
an application executed in the at least one computing device, the application configured to at least:
determine that a first client device is included in a distribution associated with a modified user experience;
in response to the first client device being included in the distribution, communicate transformation code and a network page to the first client device, the transformation code being configured to modify a Document Object Model of the network page when executed by the first client device;
determine that a second client device is excluded from the distribution associated with the modified user experience; and
in response to the second client device being excluded from the distribution, communicate the network page to the second client device, wherein the transformation code is not communicated to the second client device based on the determination that the second client device is excluded from the distribution associated with the modified user experience.

5. The system of claim 4, wherein the application is configured to determine that the first client device is included in the distribution in response to a request from the first client device, the request being associated with a reference to the transformation code included in the network page.

6. The system of claim 4, wherein the application is further configured to insert the transformation code into the network page in response to a request for the network page from the first client device.

7. The system of claim 4, wherein the application is further configured to determine that the first client device corresponds to at least one of a session identifier or an account identifier associated with a previous participation in the modified user experience.

8. The system of claim 4, wherein the transformation code is a first transformation code associated with the modified user experience, and wherein the application is further configured to associate the modified user experience with a second transformation code instead of the first transformation code.

9. The system of claim 4, wherein the application is further configured to, in response to the first client device being included in the distribution, select the transformation code as corresponding to the modified user experience from a data store.

10. The system of claim 4, wherein the transformation code is configured for execution as facilitated by a browser add-on of the first client device.

11. The system of claim 4, wherein the application is further configured to generate the transformation code based at least in part on the network page and a modified version of the network page.

12. A method, comprising:
   determining, by at least one computing device, to communicate, to a first client device, transformation code configured to modify a rendering of a network page by the first client device based on the first client device being included in a distribution associated with a modified user experience;
   selecting, by the at least one computing device, in response to the determining, the transformation code from a data store;
   communicating, by the at least one computing device, the transformation code and the network page to the first client device, wherein the transformation code is configured to modify a Document Object Model of the network page on execution by the first client device;
   determining, by the at least one computing device, a second client device to be excluded from the distribution associated with the modified user experience; and
   communicating, by the at least one computing device, the network page to the second client device, wherein the transformation code is not communicated to the second client device based on the second client device being excluded from the distribution associated with the modified user experience.

13. The method of claim 12, wherein communicating the transformation code to the first client device comprises inserting, by the at least one computing device, the transformation code into the network page.

14. The method of claim 12, wherein the determining operations are based at least in part on a distribution threshold associated with the transformation code.

15. The method of claim 12, wherein the determining to communicate the transformation code to the first client device is performed in response to a request from the first client device for the transformation code, the request being communicated by the first client device in response to a reference associated with the transformation code being included in the network page.

16. The method of claim 12, wherein the determining to communicate the transformation code to the first client device is based at least in part on an identifier associated with the first client device.

17. The method of claim 16, wherein the identifier comprises at least one of a session identifier or an account identifier.

18. The method of claim 16, wherein the transformation code is determined to be communicated to the first client device in response to a previous communication of the transformation code associated with the identifier.

* * * * *